United States Patent [19]

Dagberg et al.

[11] Patent Number: 5,737,406
[45] Date of Patent: Apr. 7, 1998

[54] DISTRIBUTED CONNECTION CONTROL IN TELECOMMUNICATION NETWORKS

[75] Inventors: L. J. Ola Dagberg, Stockholm; K. S. Tomas Aurell, Enebyberg, both of Sweden

[73] Assignee: Telefonaktiebolaget LM Ericsson, Stockholm, Sweden

[21] Appl. No.: 490,992

[22] Filed: Jun. 15, 1995

[30] Foreign Application Priority Data

Jun. 15, 1994 [SE] Sweden .................................. 9402105

[51] Int. Cl.⁶ .................................................... H04M 7/00
[52] U.S. Cl. .............................. 379/269; 379/220; 379/221
[58] Field of Search .................................... 379/201, 219, 379/220, 221, 269, 112, 230, 207, 284; 395/200.12, 200, 650, 800; 370/94.3, 60, 60.1, 255, 254

[56] References Cited

U.S. PATENT DOCUMENTS

| | | | |
|---|---|---|---|
| 5,295,139 | 3/1994 | Palmer | 370/255 |
| 5,345,503 | 9/1994 | Lee | 379/221 |
| 5,367,562 | 11/1994 | Tourbah et al. | 379/221 |
| 5,377,182 | 12/1994 | Monacos | 379/221 |
| 5,388,264 | 2/1995 | Tobias, II et al. | 395/650 |
| 5,390,138 | 2/1995 | Milne et al. | 395/800 |
| 5,455,854 | 10/1995 | Dilts et al. | 379/201 |
| 5,463,686 | 10/1995 | Lebourges | 379/221 |
| 5,485,455 | 1/1996 | Dobbins et al. | 370/94.3 |
| 5,491,800 | 2/1996 | Goldsmith et al. | 395/200.12 |
| 5,517,563 | 5/1996 | Norell | 379/221 |

FOREIGN PATENT DOCUMENTS

| | | |
|---|---|---|
| 0454332 A2 | 10/1991 | European Pat. Off. . |
| 0549504 A2 | 6/1993 | European Pat. Off. . |

OTHER PUBLICATIONS

IEEE Network Magazine, vol., Nov. 1990, J. Stacey et al., "Modeling Call Control for Distributed Applications in Telephony," pp. 14–22 (see entire document).

Primary Examiner—Krista Zele
Assistant Examiner—Scott Wolinsky
Attorney, Agent, or Firm—Burns, Doane, Swecker & Mathis, L.L.P.

[57] ABSTRACT

The invention relates to a system for handling connections in a telecommunication system including digital, computer controlled telephone exchanges and subscribers connected thereto, where the connection handling is distributed out in the network. Physical connections between subscribers are handled under the control of abstract connection models, where, in an object oriented system a number of different, mutually independent user processes are provided in such a manner that one or more of the processes under control of one of more processors control those connections which are necessary to achieve e.g. reservation of a connection path, connection set up, through connection and release of complete connection, and redirection of connections. The invention solves the problem of coordinating a number of processes by way of a set of functional objects which allow each user to control and change a connection without coordination with other users. The system uses connection models and supports the setting up of connections in a communication network. The connection models include port objects representing connection end ports and connection objects representing abstract connections between end ports. When the objects and models have been linked together in a chain, the connection can be physically set up via a connection set up function.

8 Claims, 13 Drawing Sheets

FIG. 5A

SET-UP, THROUGH-CONNECTION AND RELEASE

| DESCRIPTION | INTERWORK | | | | | | | |
|---|---|---|---|---|---|---|---|---|
| | OC | EndPort0 | Conn0 | Port0 | CSF | PortT | ConnT | EndPortT | TC |
| Starting conditions: OC and TC exist and are communicating with each other. Each has seized one access point. | | | | | | | | | |
| OC creates its connection objects: EndPort0 is created with a TP agent as input data. The TP agent contains the address to an access point. Connection objects are created with connection data (band width, type of connection) as input data and information about routing direction upon setting up of the connection. Port0 is created. | create →  create →  create → | | | | | | | | |
| The connection objects within the originating process are associated together: Associate Conn0 with Port0. | associate → | | associate → | | | | | | |
| Associate Conn0 with | associate → | | | | | | | | |

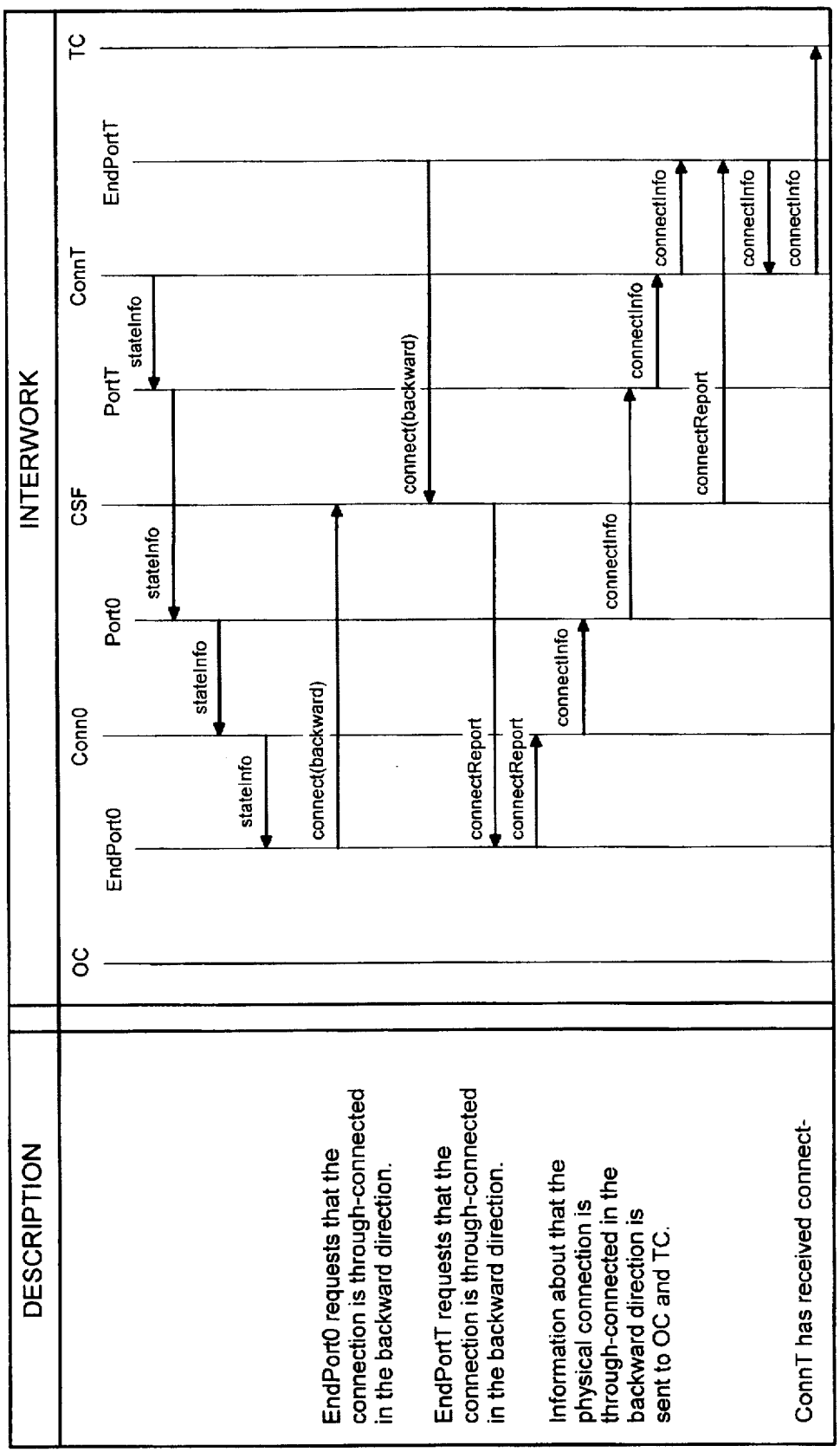

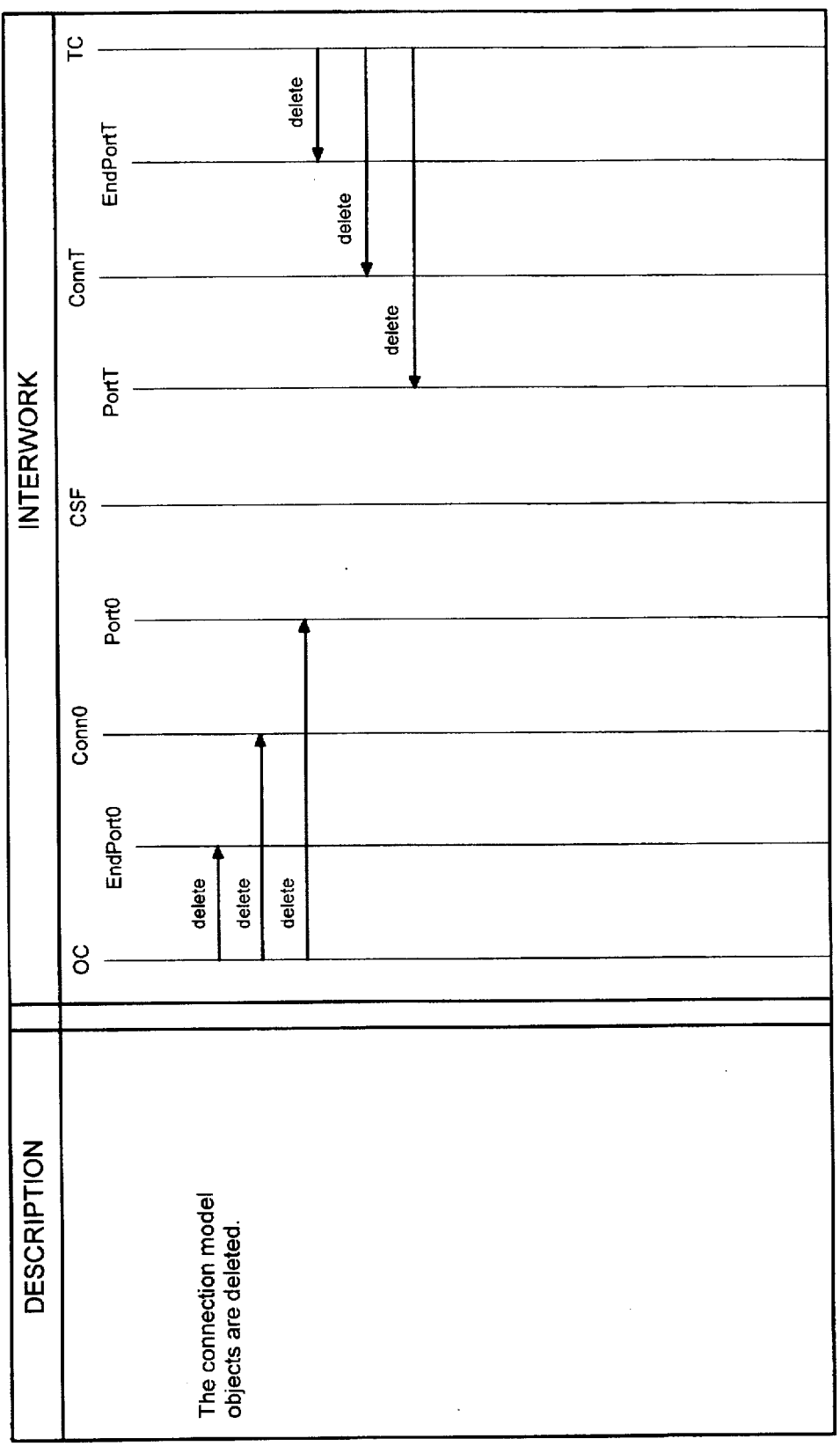

DISTRIBUTED CONNECTION CONTROL IN TELECOMMUNICATION NETWORKS

TECHNICAL FIELD

The invention relates to handling of connections in a telecommunication system comprising digital, computer controlled telephone exchanges and subscribers connected thereto, wherein the control of the handling of connections between subscribers in the network is distributed out in the network.

BACKGROUND OF THE INVENTION

In such a distributed telecommunication system it is possible that a plurality of more or less independent processes are involved in a connection. The processes can be controlled by one or more processors. Should each of these processes wish to control the connection or those connections which are necessary in order to establish a call, some kind of coordination between the processes has to take place.

A number of solutions to that problem are previously known.

a) An application-specific communication between processes is specified. This necessitates a dialogue between the processes to be established. By means of this dialogue, information about the requested connection is transferred and the state of the connection has to be hand shaken between the different processes.

b) A process is defined as master. Only the master process can fully control the connection; the other processes can merely provide the master process with data.

c) It is also possible to utilize a process for each switch in the network through which the connection is to be set up.

EP 0 454 332 A2 hereby incorporated by reference, presents a method for call handling in a telecommunication network comprising a matrix of physical network nodes, where the setting up of connections through the nodes takes place with support of an abstract model.

BRIEF DESCRIPTION OF THE INVENTION

The problems with the known methods are a) The solution with an application specific communication requires that all processes understand the specific communication in order to be able to execute the handshaking procedure. This solution requires a relatively comprehensive reconstruction for every new application.

b) In the solution with a master process, said process constitutes the only controlling process. The other processes have very limited possibilities to control or change the setting up of connections.

c) With one process per switch, the application (the user) has to have knowledge about the topology of the network. If a connection is set up through only one switch, only one user process can be utilized.

The above European patent application solves the problem by establishing a physical connection with support of an abstract model but the system does not give any support for any coordination between a plurality of independent user processes in a distributed system.

The telecommunication network according to the invention solves the problem mainly in that in an object oriented system, a plurality of different, mutually independent processes are arranged in such a manner that one or more of said processes under control of one or more processors are adapted to control the handling of that or those connections which are necessary to achieve e.g. reservation of a connection path, connection set up, through-connection and release of a complete connection between subscribers or nodes in the network, and redirection of connections, wherein abstract connection paths are adapted to be set up by means of connection models in which different types of objects, e.g. connection objects, port objects and end port objects, are linked together, said linking being carried out by means of association or preliminary association, wherein upon association of connection models, references in the form of signals exit from a port in a first connection model to a port in a second connection model, and that upon internal association within a connection model, references are supplied between adjacent connection objects and port objects, and that upon a set-up abstract connection between two end ports and between those associated connection objects, port objects and connection models, a physical connection is adapted to be set up by exchanging references between abstract and physical access points, and that upon preliminary association, it is possible to associate a further access point from the same end port above a connection set up by normal association.

The present invention relates to a system having an object oriented program structure implying that every logic component is implemented as a software object.

The invention solves the problem to coordinate a plurality of processes by means of a general set of functional objects, which allows each user (process) to control and change a connection without coordinating this with other users. The method is called connection model. A connection model according to the invention supports the setting up of connections between network access points in a communication network. The model describes the interface between the users and the physical network. A connection model comprises a set of connection and port objects in the same user process, related to each other by association or preliminary association. The connection model allows each user (process) to have its own picture of the connection, i.e. its own connection model.

The connection model enables the user to establish connections alone or together with other users and to manipulate already established connections without any coordination with other users.

The services that are offered to each user are:

Set up and release of connections.

Change of connection state, i.e. reservation and through-connection, respectively, of connections.

Connection supervision.

The possibility to logically define two connections to the same access point.

Redirection of a physical access point in an already established connection to a new access point by assigning an end object to this new access point (address).

The advantages of the method according to the invention is that it is possible to let a plurality of processes control a connection without any coordination procedure and without any knowledge about the topology of the network, e.g. through how many switches a connection is set up. The inventive idea is applicable in all types of communication systems having distributed control.

BRIEF DESCRIPTION OF THE DRAWING

The method according to the invention will be described more in detail below by means of an embodiment with reference to the appended drawing on which FIGS. 5A–5K illustrate an exemplary implementation of signal exchange according to the invention.

PREFERRED EMBODIMENT

To facilitate the understanding of the description of the invention, certain expressions that are used, are explained below.

Process=A series of events that execute in an isolated environment with separate program and data memory.
Object=In an object oriented software system an object is the abstract transcription of a physically or logically definable unit.
Connection model=A comprehensive method for abstract handling of connections; there can be several models for one connection.
Connection=Abstract connection in a connection model.
Port=Access point that can be called in a connection model.
The ports represent access points towards the physical network, in this case the switching network.

The connection model is made up of objects of two classes, namely ports and connections. The port objects represent connection end points (access points) while the connection objects represent abstract connection between end points.

Figure 1:
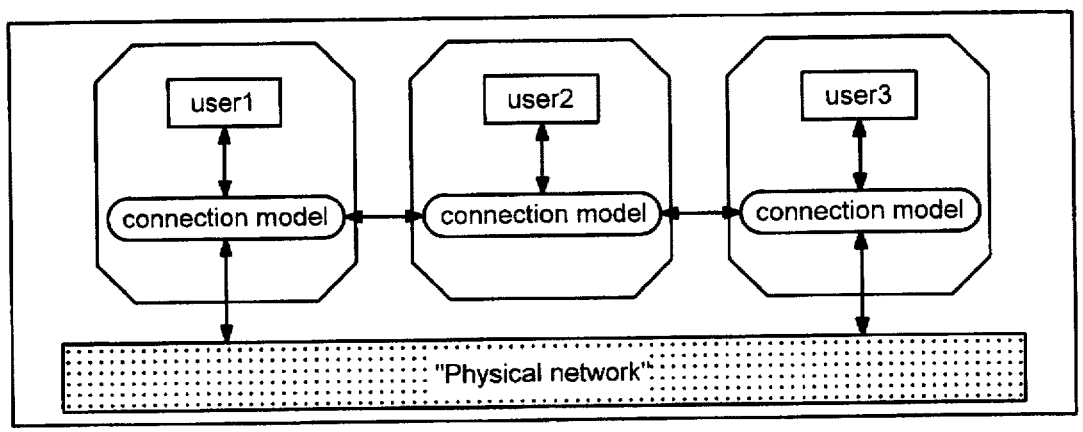
FIG. 1 is a sketch which illustrates the linkage between a number of connection models and the physical network.

To create a physical connection through the network, as apparent from FIG. 1, the users 1–3 according to the example have to link their models together in a chain. The association (connection) between the models is created by an exchange of references (signals) between the user processes and further association of these references to the port objects. A physical connection is created in the network when all models are linked together and two access points are associated to the respective end of the chain. The expressions association, object etc. refer to the fact that it, in this object oriented system, is a matter of, in the first hand, creating abstract connections which can not be set up physically until an abstract set-up between models and end points is ready. What the invention comprises is essentially the interface between the service controlling functions and the physical network.

Figure 2:
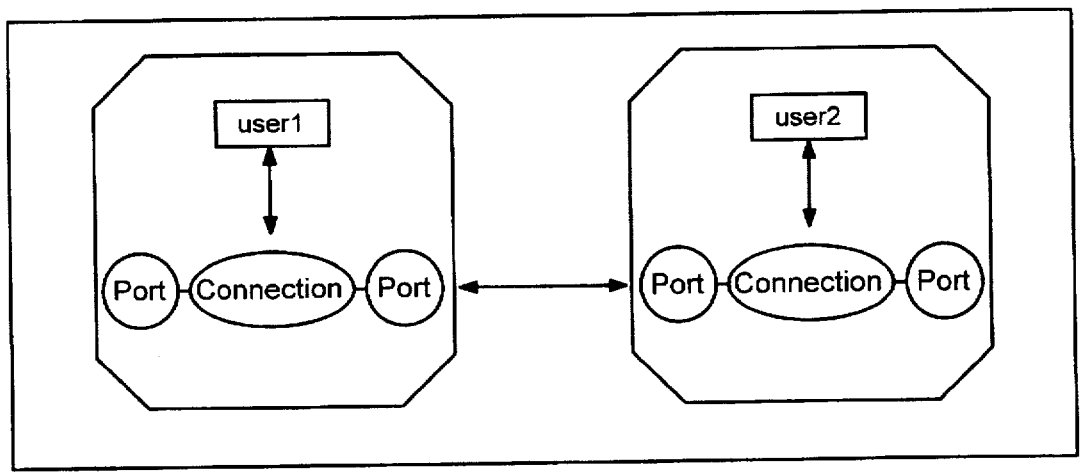
FIG. 2 illustrates the association between two connection models and the internal association between ports and connections in each connection model.

By association is meant linkage both of different models and of the objects within a model which is illustrated in FIG. 2. The connection models are linked together by associating ports in different models to each other. The models are constructed by associating connections to ports or other connections. It is not necessary for the user to create the models or the objects in the models in any particular order.

Figure 3A:
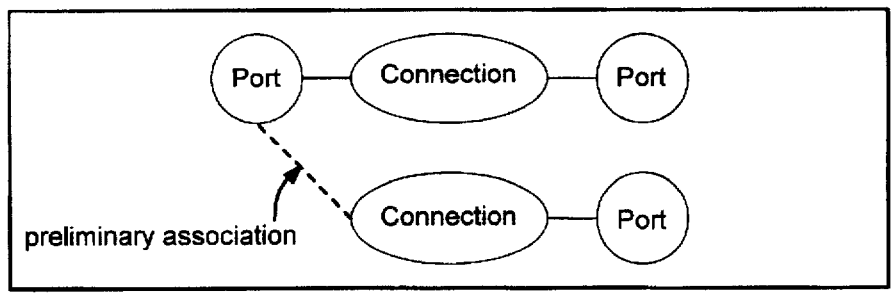
FIG. 3a is a sketch which illustrates the preliminary association function in general.
Figure 3B:
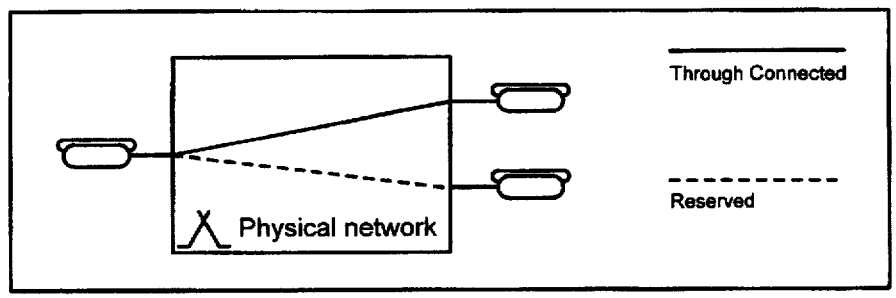
FIG. 3b illustrates the physical through-connection in a connection model.

By preliminary association is meant that a port can be associated to a further connection object above the object the port normally is associated to as illustrated in FIG. 3a. A chain of connection models which comprises a preliminary association, can not physically be connected through as indicated in FIG. 3b where a normal association brings about a through-connection of a connection but where a preliminary association merely brings about a reservation of a connection. By influencing the port object it is possible for the user to change a normal association into a preliminary association and at the same time change a preliminary association into a normal association. Preliminary association can be used to implement such functions as "call waiting" or "accelerating a call upon a busy condition". As mentioned, preliminary association is used merely for reservation of connections but never for through-connection.

An embodiment of the invention will be described in accordance with the below example which with support of FIG. 4 and an arrow diagram illustrates the implementation of the connection model function.

Said computer system is of a real-time system type having a support for executing software in parallel/"semiparallel" in so called processes.
There is support to set up dialogues and to communicate between the processes.
In the example chosen the function supports two service controlling functions ("applications") OC and TC, respectively, which are executed in two separate processes, one for originating call service for a subscriber A and one for terminating calls for a subscriber B.
These two processes communicate with each other by a so called service dialogue to transfer service information, i.e. information about how the connection is to behave. In this example this dialogue is called TSD (Teleservice Dialogue) but other types of protocols which fulfil the particular requirements of the application may also be used. The information that has to be transferred on this service dialogue between the processes in order to set up connections, are those references that are needed to establish a connection model dialogue CNMD, The references/signals mentioned earlier are such parameters which e.g. contain such information which points out unique port objects and which are necessary to carry out certain procedures e.g. association between two connection models in adjacent processes.

When CNMD has been established, address information and desired condition of the connection (reserved or through-connected) will be transferred onto CNMD without the service controlling functions being effected or involved.
The connection model requires that there is a connection set up function CSF which upon request can interconnect two points in the internal switching network. The interface towards this connection set up function is independent of what this network looks like and how many switches there are in same.
As apparent from FIG. 4, the connection set up function has two dialogues, namely a dialogue CSFOD on the originating side where the connection is requested, and a dialogue CSFTD on the terminating side where the result is communicated. For details about how these dialogues are used, reference is made to the appended arrow diagram.
The connection set up function CSF does not have to be executed in only one process but can be divided onto several processes with internal protocols therebetween if the network through which the connection is to be set up, is physically distributed. However, it is essential that the structure with the two dialogues CSFOD and CSFTD is maintained.

In accordance with the example, two processes are to set up a common connection. The two service controlling functions using the connection model are called OC (Originating Call) and TC (Terminating Call).

The connection model objects are denoted with an O and a T, respectively, at the end in order to show in which process they are.

The communication between the service controlling functions and the connection model objects is carried out by so called method calls with direct answers. Moreover, notifications or "events" will be communicated to the user by the model e.g. when the through-connection is ready.

The arrow diagram illustrates set up, through-connection in two steps, and release.

Figure 4:
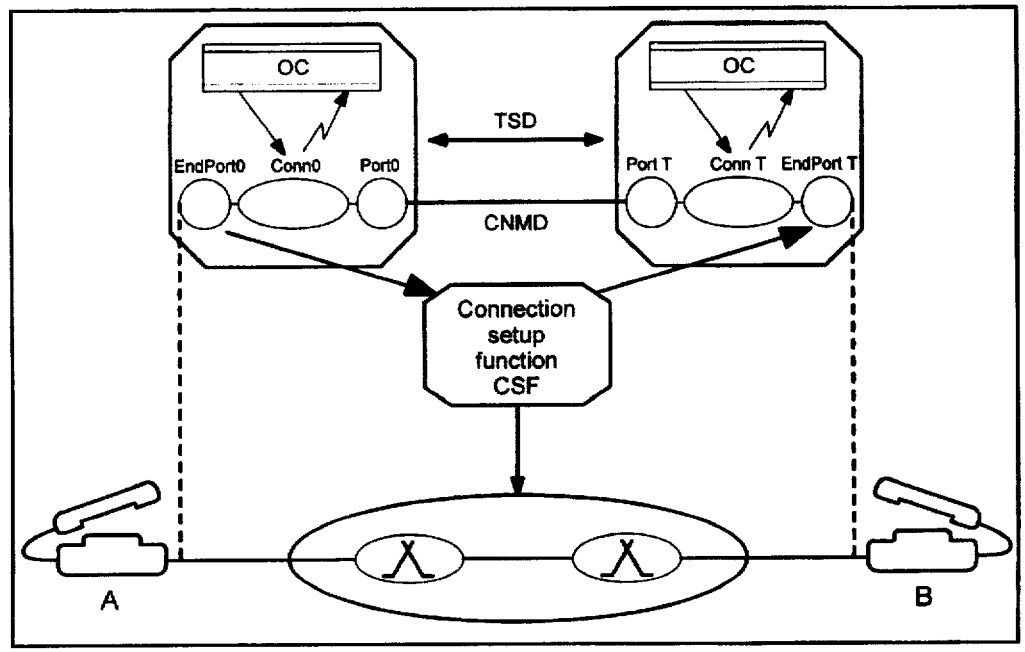
FIG. 4 illustrates in the form of a block diagram how traffic controlling functions in two processes together order a connection through the internal network by means of the connection model according to the invention.
Figure 5B:
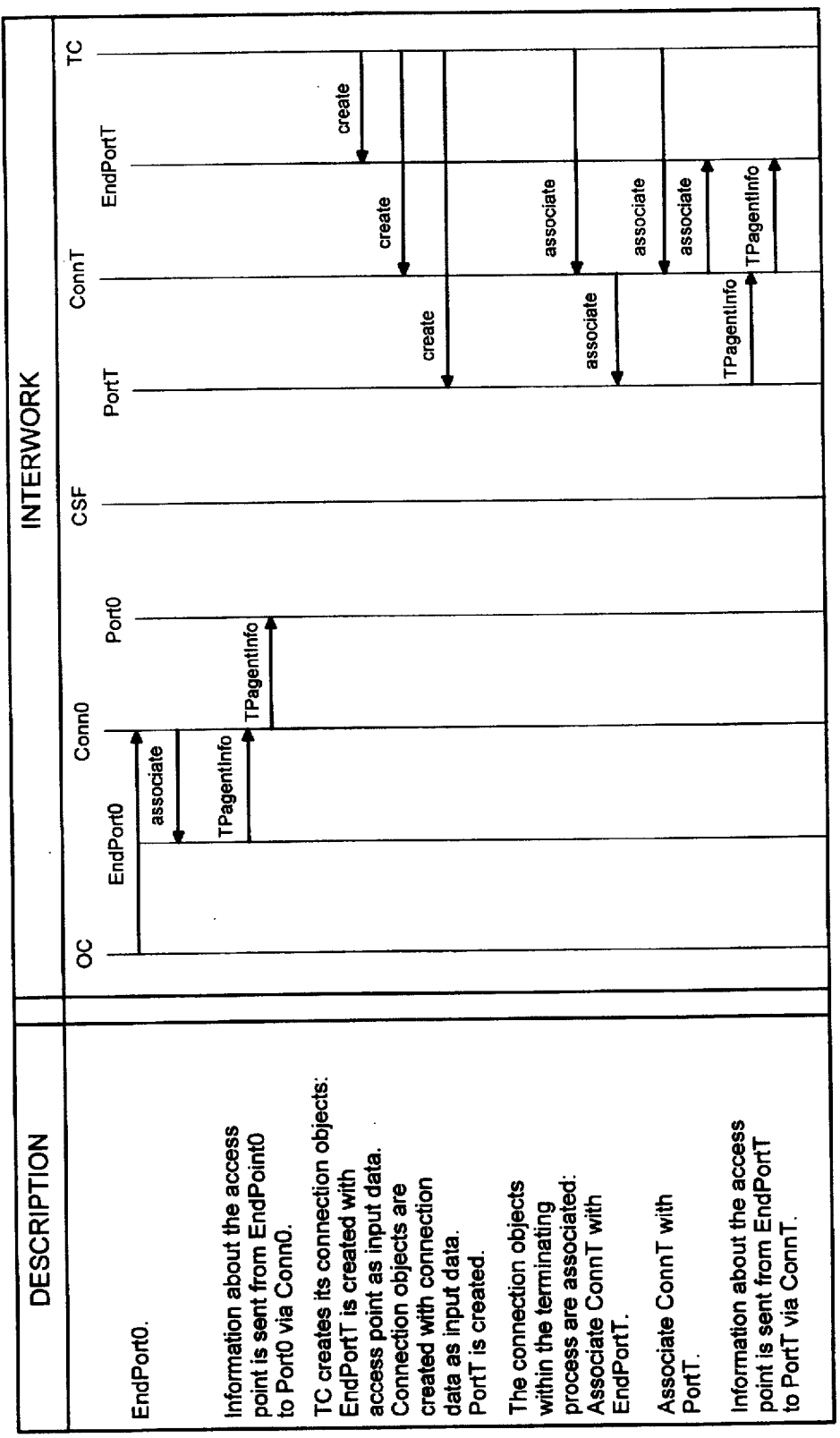
Figure 5C:
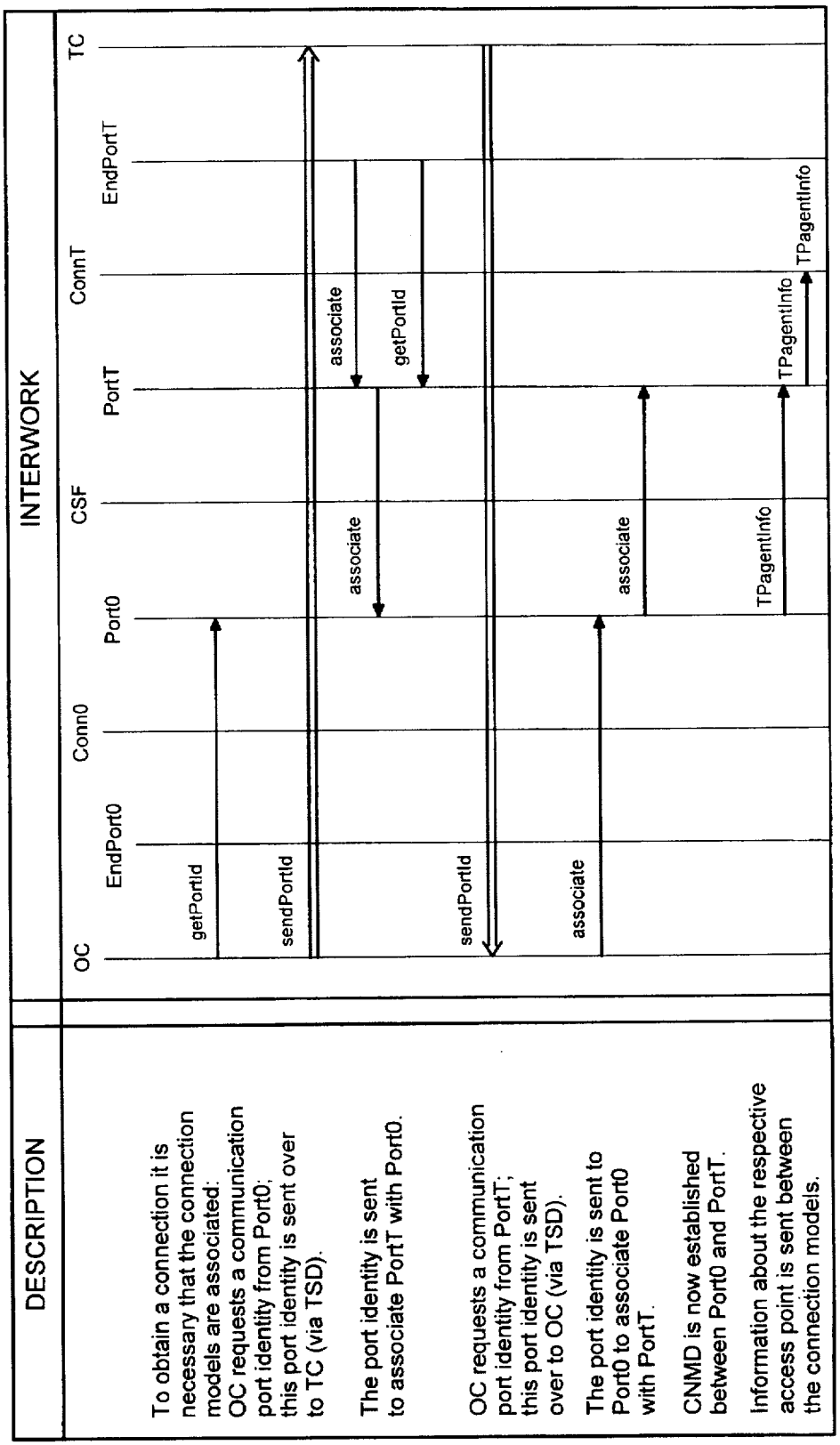
Figure 5D:
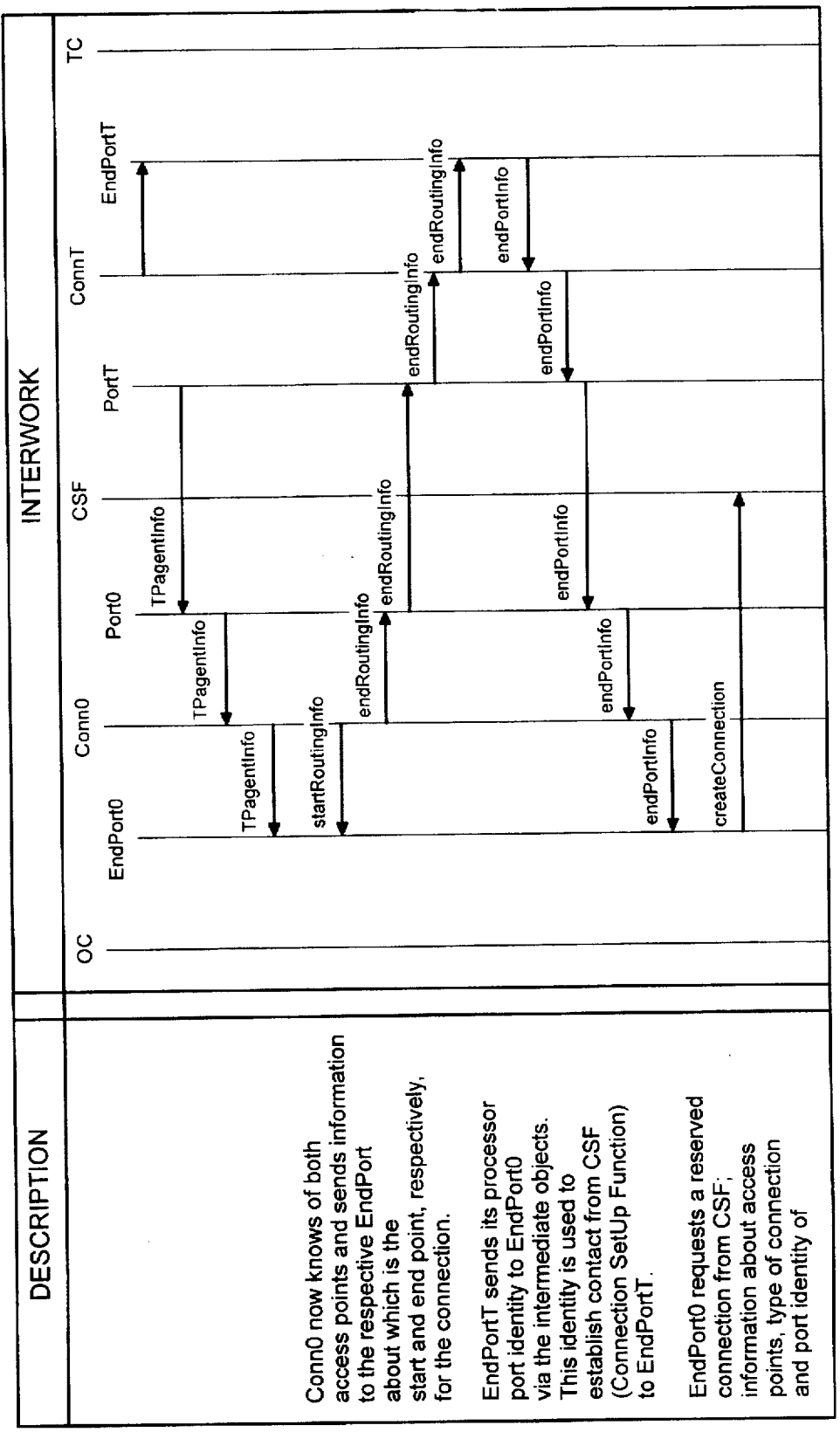
Figure 5E:
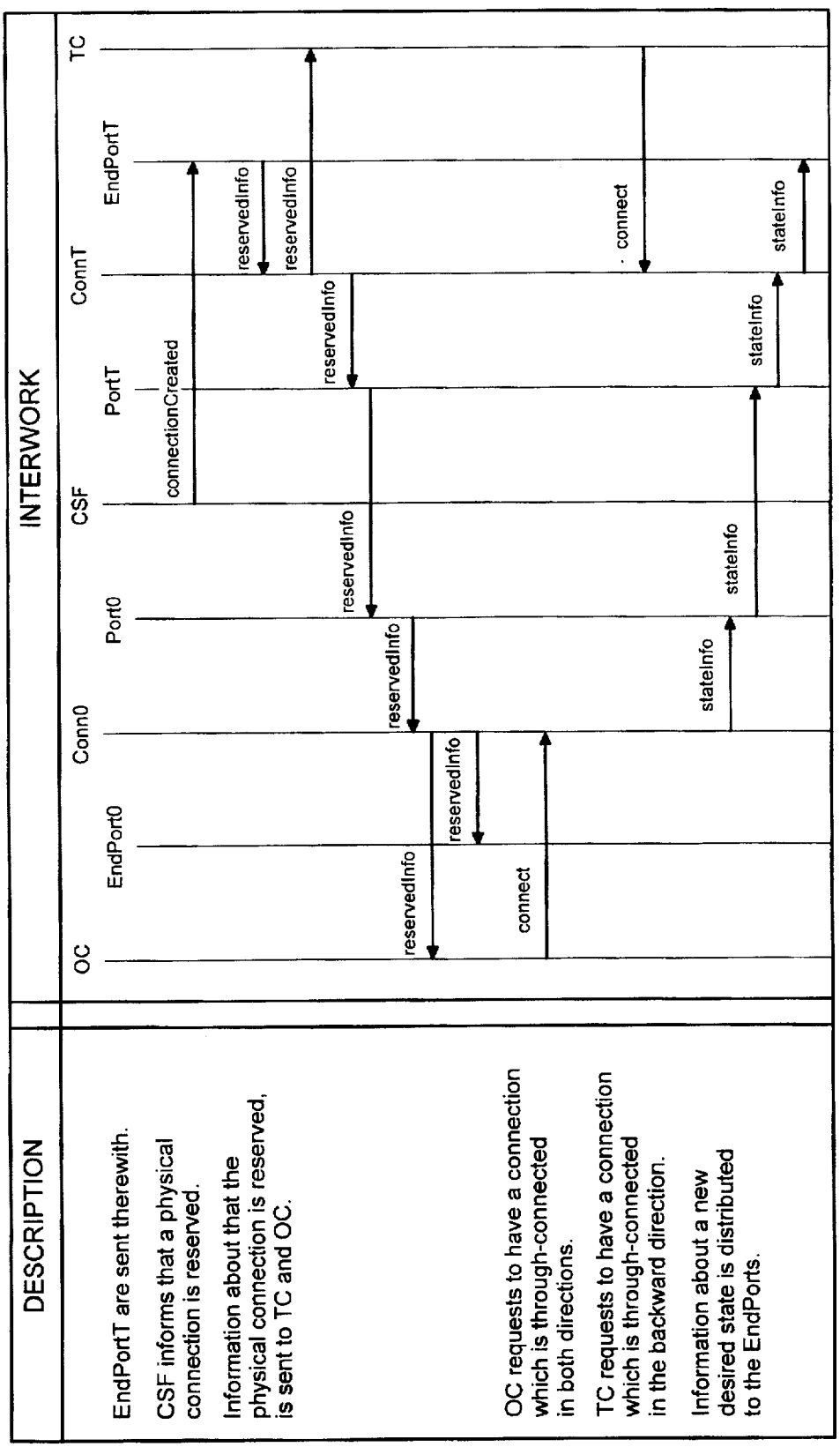
Figure 5G:
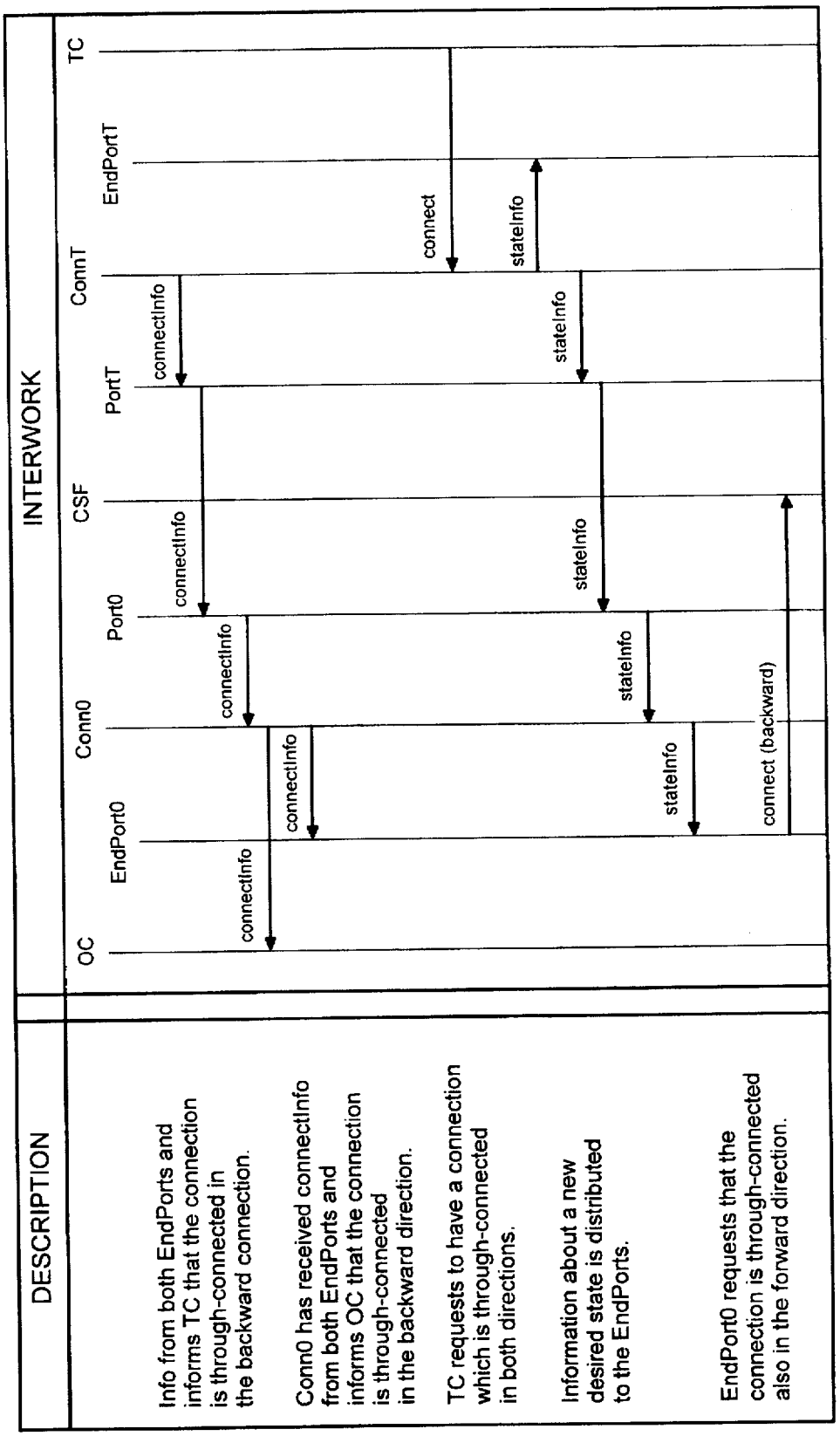
Figure 5H:
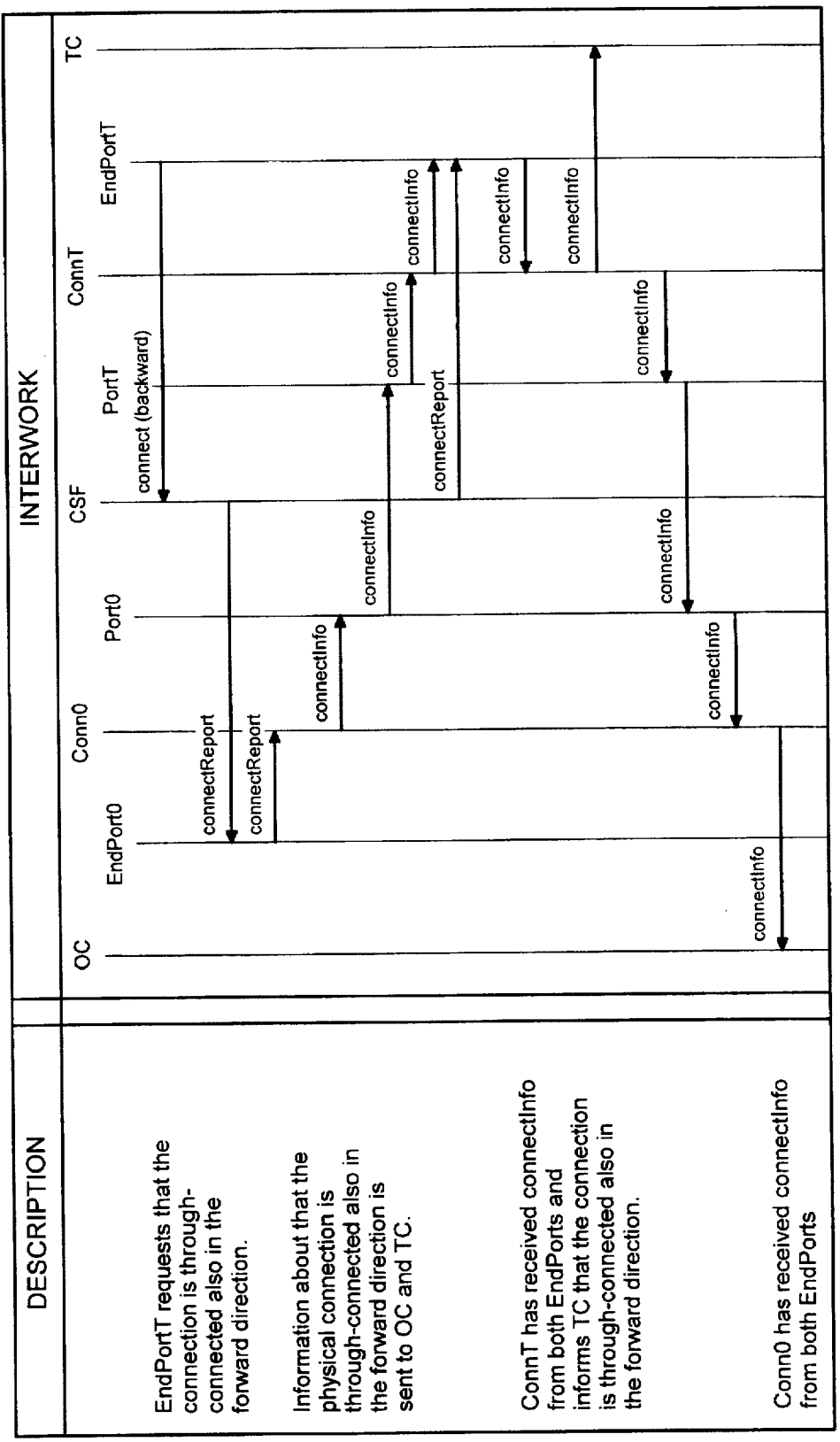
Figure 51:
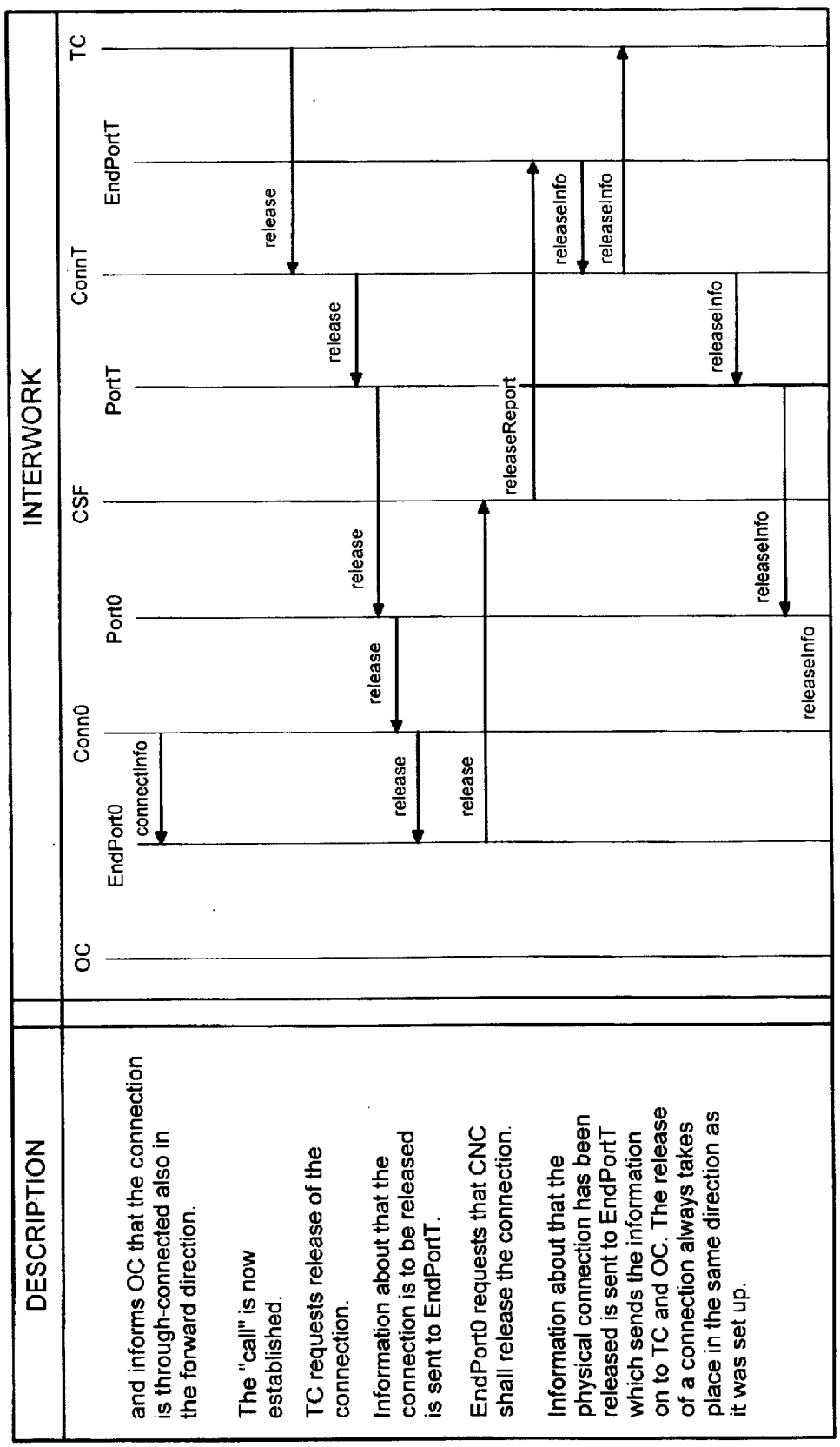
Figure 5J:
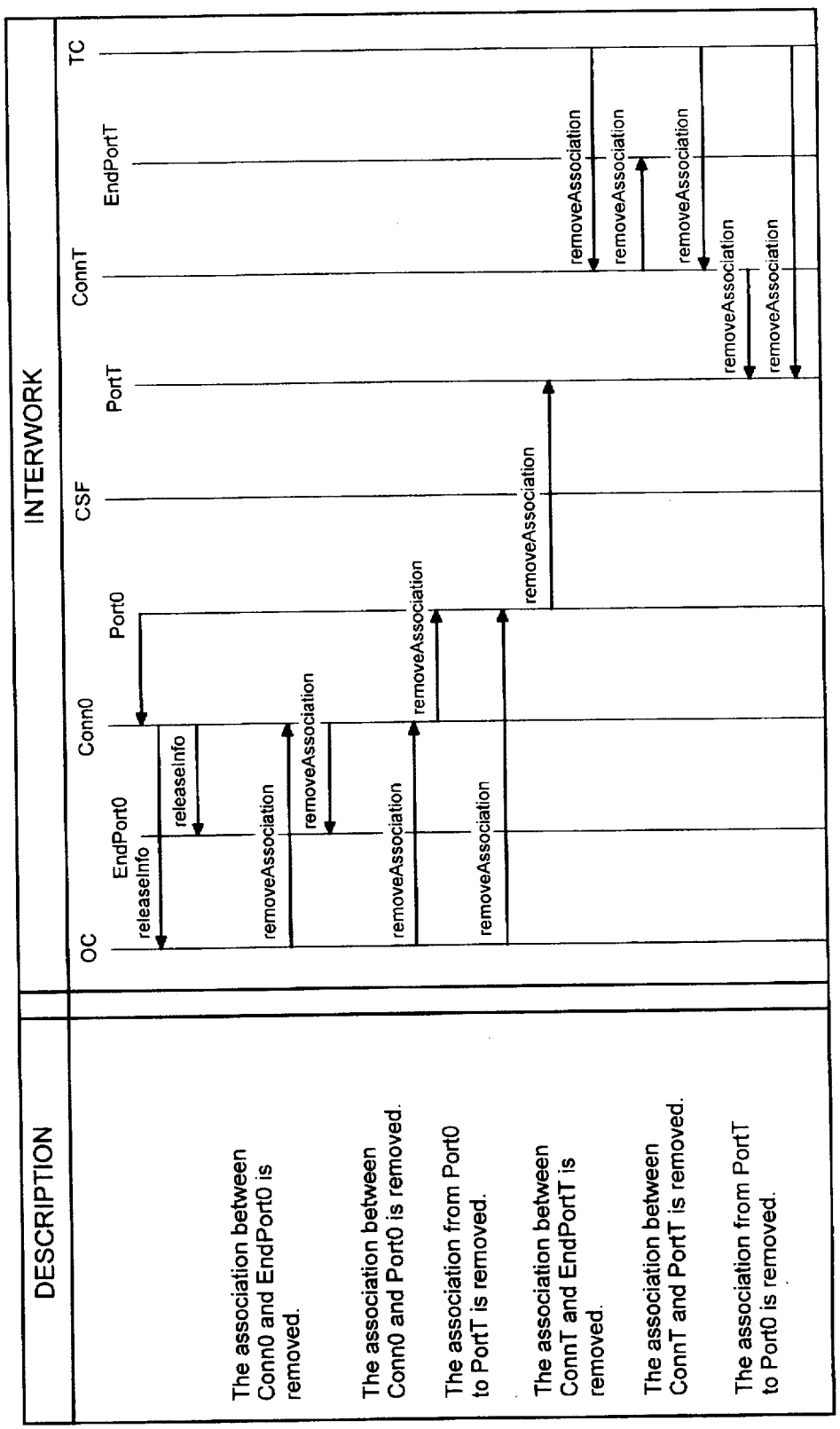

Above the example according to FIG. 4 which illustrates the simplest case, the model contains support for redirecting an already established connection, a possibility to prepare two connections to the same access point and then choose between those, and finally handling of connection-related data (accumulated delay, echo cancellation information etc).

As apparent from FIG. 4, two processes OC and TC, respectively, are to set up a common connection. The physical connection which is to be set up is a connection between two subscribers A and B. A connection model according to the invention comprises a set of connection objects ConnO, ConnT and port objects PortO, PortT, EndPortO and EndPortT related to each other by association or preliminary association. An abstract connection is a set of connection objects and port objects associated to each other to form a chain. The chain is terminated by a port object in each end. These two ends represent contact possibilities to physical access points. Therefore FIGS. 5A–5K illustrate arrow diagram which illustrates an example on the implementation of the method according to the invention which means that the signal exchange is illustrated for bringing about set up, through-connection and release of a connection. The arrows and the levels in the arrow diagram point out in which order and in which direction the signalling takes place to bring about the desired actuation of the different objects. To get a good understanding of the processes, the description of the events is written into a table alongside the direct course of events which is indicated by arrows. All originating functions are marked with an O and all terminating functions are marked with a T.

What is claimed is:

1. In a telecommunication network including digital controlled telephone exchanges and connected subscribers, wherein control of the handling of connections between subscribers is distributed in the network, an object oriented system comprising:

one or more processors for implementing a plurality of different, mutually independent processes for controlling the handling of connections that are required for connection set-up through connection and release of complete connections between subscribers or nodes of the network and redirection of connections;

one or more processors implementing connection models for setting up abstract connection paths by linking together connection objects, port objects or end port objects, the connection models being substantially identical and each connection model simulating a complete connection, wherein the linking is carried out by at least one of normal association, internal association, and preliminary association;

upon normal association of connection models, references are sent from a port in a connection model to a port in a second connection model, and upon internal association of objects within a connection model, references are supplied between adjacent connection objects and ports, and a physical connection for exchanging references between abstract and physical access points upon a set-up abstract connection between two end ports and between the associated connection objects, port objects, and connection models, wherein upon preliminary association, references are supplied between a port object and a connection object that is in addition to a connection object to which the port object is associated by normal association.

2. The object oriented system of claim 1, wherein each of the plurality of different, mutually independent processes further control and change a connection without any coordination with other processes and without any knowledge of the topology of the network.

3. The object oriented system of claim 2, wherein more than one connection model can be included in a connection path.

4. The object oriented system of claim 1, wherein the ports and connection objects are made up of callable objects in a connection model.

5. The object oriented system of claim 1, wherein the objects are made up of abstract counterparts to physically definable conceptions.

6. The object oriented system of claim 1, whereto a physical connection can not be established until an abstract connection is set-up in full in a chain.

7. The object oriented system of claim 1, wherein the processes are user related.

8. The object oriented system of claim 1, wherein the redirection of connections implies associating a new access point to an end object.

* * * * *